United States Patent [19]
Nichols

[11] Patent Number: 6,073,427
[45] Date of Patent: Jun. 13, 2000

[54] METHOD AND APPARATUS FOR COUNTING CROPS

[76] Inventor: Stephen W. Nichols, 03551 Casebeer-Miller Rd., Edgerton, Ohio 43517

[21] Appl. No.: 09/096,121

[22] Filed: Jun. 11, 1998

[51] Int. Cl.⁷ .................................................. A01F 12/50
[52] U.S. Cl. ........................................... 56/10.2 B; 460/7
[58] Field of Search ........................ 56/1, 10.2 A, 10.2 R, 56/10.2 B, 10.2 D, DIG. 15; 364/424.07, 58.5 B, 696; 460/7, 149, 119

[56] References Cited

U.S. PATENT DOCUMENTS

| | | | |
|---|---|---|---|
| 3,978,324 | 8/1976 | Rayner | 235/151.3 |
| 4,149,163 | 4/1979 | Fathauer | 340/684 |
| 4,164,669 | 8/1979 | Knepler | 310/15 |
| 4,166,948 | 9/1979 | Steffen | 250/214 B |
| 4,239,010 | 12/1980 | Amburn | 111/1 |
| 4,246,469 | 1/1981 | Merlo | 235/92 |
| 4,333,096 | 6/1982 | Jenkins et al. | 340/684 |
| 4,451,781 | 5/1984 | Anderson | 324/65 P |
| 4,555,624 | 11/1985 | Steffen | 250/223 R |
| 4,635,215 | 1/1987 | Friend | 364/555 |
| 4,675,520 | 6/1987 | Harrsen et al. | 250/222.2 |
| 4,710,757 | 12/1987 | Haase | 340/684 |
| 4,782,282 | 11/1988 | Bachman | 324/61 R |
| 4,823,268 | 4/1989 | Giles et al. | 364/424.07 |
| 4,918,441 | 4/1990 | Bohman | 340/901 |
| 5,222,191 | 6/1993 | Enomoto | 395/3 |
| 5,245,695 | 9/1993 | Basehore | 395/3 |
| 5,260,875 | 11/1993 | Tofte et al. | 364/424.07 |
| 5,261,036 | 11/1993 | Nakano | 395/61 |
| 5,281,810 | 1/1994 | Fooks et al. | 250/222.1 |

(List continued on next page.)

FOREIGN PATENT DOCUMENTS

| | | |
|---|---|---|
| 587898 | 1/1978 | U.S.S.R. . |
| 001782 392A-1 | 12/1992 | U.S.S.R. . |
| 1782392 | 12/1992 | U.S.S.R. . |

OTHER PUBLICATIONS

"Seed Computer Sensor System Draws Top Design Award", by Pioneer Technology, Inc., Implement & Tractor, Dec. 1985, pp. 8 and 9.

*Primary Examiner*—Robert E. Pezzuto
*Attorney, Agent, or Firm*—Baker & Daniels

[57] ABSTRACT

The present invention involves an apparatus for counting agricultural products being harvested. An agricultural implement has at least one harvesting element with a moisture detector installed proximate the harvesting element. The moisture detector has a detection range, whereby the moisture detector produces a signal when a moisture-containing product is located within the detection range. A counter is in communication with the moisture detector, which maintains a count of the signals. The moisture detector communicates the signal to the counter to increase the count. The apparatus is used to count a plurality of items being processed by first installing a moisture sensor with the agricultural equipment. Next, the counter is connected to the moisture sensor, with the counter being adapted to respond to the detectable signal from the sensor by incrementing the count. By processing the items by the agricultural equipment, the plurality of items thereby enter and exit the range of detection. Each of the items which enter and exit the range cause the sensor to produce the detectable signal. The counter receives each of the detectable signals and increases the count in response, whereby the count corresponds to the quantity of items being processed by the agricultural equipment. The said counter further comprises a reset switch, a relay element, and a counter element. The relay element comprises a digital relay. The moisture detector comprises a capacitive proximity switch. A detection surface of the moisture detector is disposed substantially perpendicularly to a longitudinal axis of the harvesting element. The agricultural implement comprises a plurality of harvesting elements, and a plurality of moisture detectors are installed proximate to respective ones of the harvesting elements.

21 Claims, 4 Drawing Sheets

U.S. PATENT DOCUMENTS

| | | | |
|---|---|---|---|
| 5,307,443 | 4/1994 | Tanaka | 395/3 |
| 5,321,639 | 6/1994 | Krishnamoorthy et al. | 364/606 |
| 5,324,931 | 6/1994 | Fooks et al. | 250/222.1 |
| 5,336,882 | 8/1994 | Fooks et al. | 250/221 |
| 5,339,365 | 8/1994 | Kawai et al. | 382/54 |
| 5,347,117 | 9/1994 | Fooks et al. | 250/221 |
| 5,480,354 | 1/1996 | Sadadi | 56/10.2 B |
| 5,518,454 | 5/1996 | Twilley et al. | 460/7 |
| 5,524,424 | 6/1996 | Halgrimson et al. | 56/10.2 D |
| 5,568,405 | 10/1996 | Easton et al. | 364/561 |
| 5,598,794 | 2/1997 | Harms et al. | 111/177 |
| 5,635,911 | 6/1997 | Landers et al. | 340/674 |
| 5,646,846 | 7/1997 | Bruce et al. | 364/424.07 |

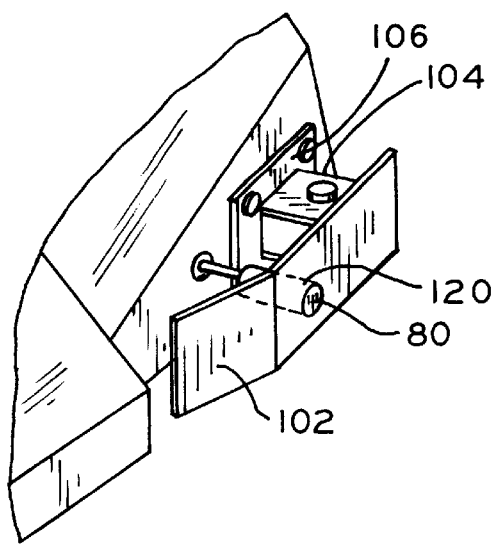
FIG_6
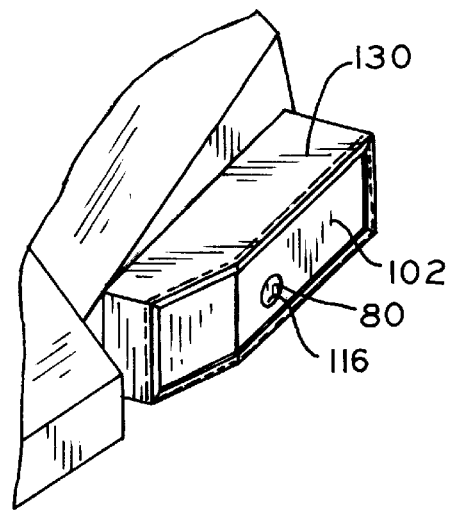
FIG_8
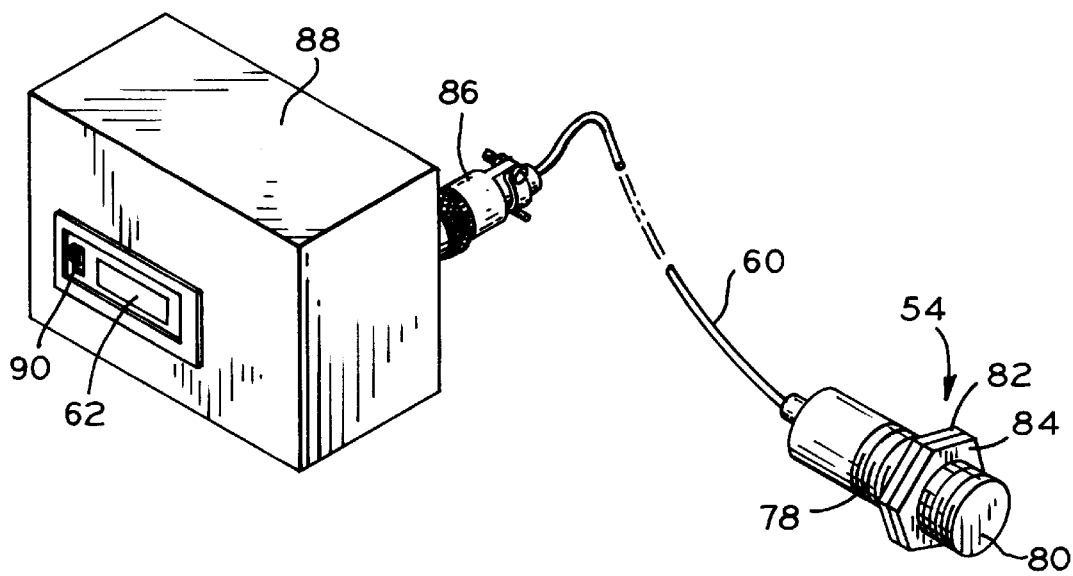
FIG_4

METHOD AND APPARATUS FOR COUNTING CROPS

BACKGROUND OF THE INVENTION

1. Field of the Invention

The present invention relates generally to the area of precision farming, which involves determining where to apply fertilizers, locating soil deficiencies, determining yield variances in specific areas of their fields, and evaluating the efficiency of farming. More specifically, the field of the invention is that of yield monitoring.

2. Description of the Related Art

A century ago the average farmer fed about 8 people with his labors. Today he feeds about 212 people, and in the future the figure will be even higher. One of the ways in which farmers have been increasing their yields has been through precision farming. Precision farming tools and tactics include global positioning systems (GPS), grid mapping which involves taking soil samples at precise locations year after year, geographic information systems (GIS), yield monitoring and precision applications.

Through all of these methods, yields of crops have increased markedly year after year. For example, the average bushels produced per acre in 1926 was 25.7 whereas in 1996 the average bushel per acre of corn produced was 127.1 bushels per acre. At the same time, the number of corn acres planted from 1928 to 1996 has decreased. In 1936, the number of corn acres planted was 101,959, whereas in 1996 the number of corn acres planted was 79,487. Yet at the same time the total U.S. corn production has increased from 2,140,270, bushels in 1926 to 9,293,435, bushels in 1996. Much of these advances have been made possible by advances in technology such as developing better seeds, better weed killers and fertilizers, no-till farming methods, and the like. However, the agricultural community is always searching for further improvements to increase yield.

There are many types of data that farmers and research companies are continually striving to collect, one of which is counting stalks of corn in the field as the stalks are being harvested. Seed developers, chemical companies, farmers and even insurance companies have been seeking for years a reliable method of counting stalks of corn as they are harvested. Corn technology has progressed to the point where genetic alteration has enabled scientists to develop seed varieties which meet climatic conditions in all 50 states and around the world. To develop these hybrids, developers plant multiple fields with various seed types, but need to verify the quantity of yield before going to market. Conventionally, these companies use manual labor to go into a field and count crops. However, such a manually intensive approach is neither cost effective nor reliable.

In an effort to overcome the problems and excessive cost involved in manually counting stalks of corn in the field, automatic counting devices which can be attached to a combine have been developed. Unfortunately, these known counting devices do not perform adequately.

One known device is comprised of a mechanical ticker which is tripped by a passing stalk. The problem with such a device is that the manual ticker can become tangled on leaves from the stalks and other debris as the combine passes through the rows of corn.

Another such device for counting stalks of corn relies upon optical light detection. In this device, an optical infrared or other light sensor is mounted to a row separator or other part of the combine and the sensor is activated as a stalk of corn passes the optical clearance of the sensor. Unfortunately, however, leaves and other debris also enter the optical clearance and trip the light sensor so that the count obtained is highly inaccurate. That is to say, these known devices do not provide an accurate count of stalks of corn because they cannot distinguish between actual stalks of corn and other debris such as leaves.

Chemical companies that produce weed killers and fertilizers also have been seeking an accurate way to evaluate plant survival to the time of harvest, such as counting crops as they are harvested and then comparing the count to the number of seeds planted in any given area. Comparing such data enables fertilizer and weed killer producers to evaluate the effectiveness of their products.

Farmers are also desirous of having data on the count of crops harvested. For instance, a farmer who plants using no-till methods uses a device that drills each seed into the ground at the time of planting. If the farmer had an accurate method and apparatus to count the corn stalks in each row as they are harvested, the farmer could judge his or her seed drill performance. Modern farmers are particularly advanced in their farming methods, relying on some of the high tech techniques described above. However, more accurate and reliable methods and apparati for counting stalks of corn as they are harvested is needed.

SUMMARY OF THE INVENTION

The present invention is a method and apparatus involving a moisture sensor for counting crops as they are harvested. The present invention includes a capacative sensor which detects moisture in a crop being harvested and produces a signal in response, which in turn is sent to a counter which tallies the crops as they are being harvested. The present invention detects moisture in the stalk while ignoring leaves and other debris.

In one form, the present invention comprises a method of using a farm combine to count stalks of corn plants as they are being harvested. The method comprises a first step of installing a moisture sensor in a row separator of the combine. The sensor has a range of detection and produces a detectable signal when a stalk of corn is located within the range. Next, a counter adapted to receive the detectable signal from the sensor is connected to the sensor. The counter responds to the detectable signal of the sensor by producing an integral change in the count. After installing the moisture sensor in the counter as described above, the farm combine is driven through a field of corn ready for harvesting. While driving the combine, the row separator is maintained in alignment with a row of the corn stalks. Thus, a plurality of the stalks enter and exit the range of detection of the sensor whereby each of the stalks which enter and exit the range cause the sensor to produce the detectable signal. The counter receives each of these detectable signals and increases the count in response thereto. The count displayed on the counter corresponds to a quantity of stalks being harvested through the row separator.

In a further form of the above method, the counter further comprises a counter element and a relay element whereby the relay element relays the detectable signal to the counter element. The relay element is preferably a digital relay.

In yet another form, the present invention comprises an apparatus for counting stalks of corn being harvested. The apparatus comprises a farm combine having a row separator attached and a moisture detector installed in the row separator. The moisture detector has a detection range, whereby the moisture detector produces a signal when a moisture containing stalk of corn is located within the range. A counter is in communication with the moisture detector and maintains a count. The moisture detector communicates the signal to the counter whereby the counter increases the count.

In yet another form, the present invention comprises an electronic device adapted for counting crops as they are harvested. The device comprises a moisture sensor attached to a harvesting portion of a farm vehicle. The moisture sensor has an attached power supply. The moisture sensor has a range of detection and produces a detectable signal when a moisture containing crop enters and exits the range. A relay element is connected to the moisture detector and adapted to relay the signal to a counter element which is connected to the relay element. The counter element is adapted to receive the signal relayed by the relay element and maintain a count of crops harvested.

One advantage of the present invention is that the moisture detector is not triggered by leaves and other debris as they pass by the moisture detector. This is so because such leaves and debris do not possess the requisite moisture content to produce a detectable signal from the moisture detector. Advantageously then, the count obtained by the counter of the present invention is highly accurate because the count is not effected by extraneous material passing by the sensor.

Another advantage of the present invention is that it does not rely on any mechanical movement or optical clearance to produce a count, unlike prior art structures. Because the present invention employs no moving parts and requires no optical clearance which can inadvertently become tangled and triggered by leaves and other debris, the present invention maintains a highly reliable count.

Another advantage of the present invention is its cost. The present invention employs an economy of parts, all of which are widely available through commercial vendors at a low cost. Thus, the present invention provides a method and apparatus for the average farmer to maintain a count of his or her crops as they are being harvested.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 4 is a perspective view showing component parts of the present invention;

FIG. 6 is a perspective view showing a sensor of the present invention attached to a row separator;

FIG. 8 is an alternate arrangement of a sensor of the present invention mounted to a row separator.

Figure 1:
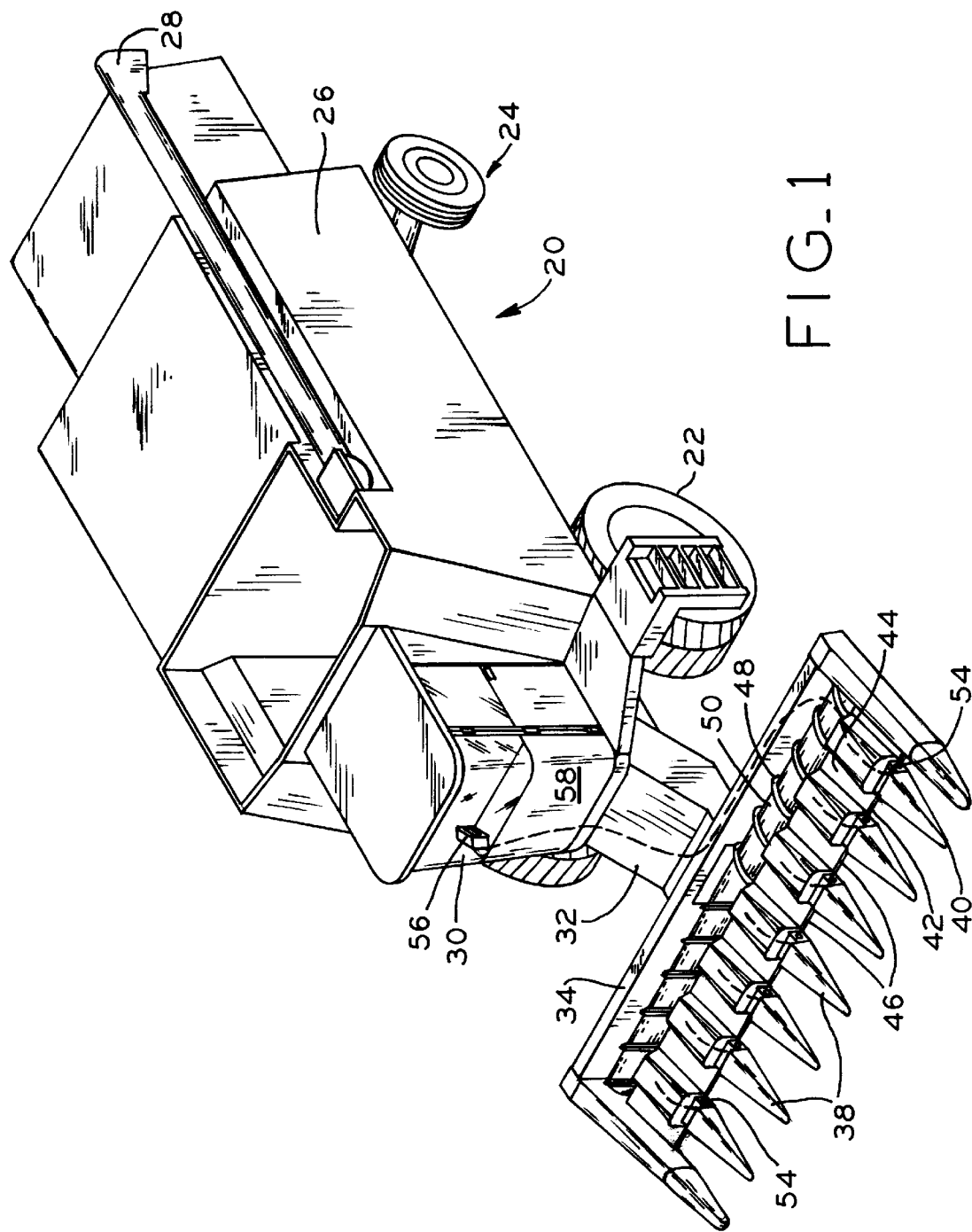
FIG. 1 is a perspective view of a farm vehicle including the sensor arrangement of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DETAILED DESCRIPTION OF THE INVENTION

The embodiment disclosed below is not intended to be exhaustive or limit the invention to the precise form disclosed in the following detailed description. While the exemplary embodiment deals with a crop counter for counting stalks of corn, the principals of the invention may be applied to a variety of different moisture containing crops, such as the ears of corn themselves. Rather, the embodiment is chosen and described that others skilled in the art may utilize the teachings of the invention.

Referring to FIG. 1, an agricultural vehicle 20 includes a pair of drive wheels 22 located at the front end of vehicle 20, a pair of steerable wheels 24 located at the rear end of vehicle 20, a machinery and grain storage compartment 26, a grain elevator and chute 28, an operator cab 30, and a support frame (structure) for joining and supporting the above listed components. By way of example, vehicle 20 may be a combine of the type manufactured by Case Corporation having model No. 1660.

Attached to a feeder 32 at the front end of the frame of vehicle 10, (i.e., the front-most end of vehicle 20 along its forward direction of travel during harvesting) is a header 34 such as a grain harvesting header. By way of example, header 34 could be a Combine Corn Head Series 1000 sold by Case Corporation. Header 34 is positioned relative to vehicle 20 and/or the surface upon which vehicle 20 is moving.

As shown in FIG. 1, header 34 includes a plurality of row separators 38 projecting forward. Row separators 38 have pointed ends 40 and rectangular end 42 which attaches to plate 44 extending along the length of header 34. Plate 44 includes cutting edge 46, a portion of which is exposed between each of row separators 38. Toward the back of header 34 is channel 48 having rotatably disposed auger 50. Thus, as the combine moves forwardly, row separators 38 direct stalks of corn into cutting edges 46 whereafter the cut stalks fall into channel 48 and are directed towards header 32 by auger 50.

As further shown in FIG. 1, row separators 38 include sensors 54 installed between pointed ends 40 and rectangular plates 44. Sensors 54 are connected to counter relay 56 disposed in interior 58 of operator cab 30 by shielded wire 60 shown in dashed lines in FIG. 1. Sensors 54 detect moisture in corn stalks and produce a signal in response to a stalk being within spacing between row separators 38 for detection by each of sensor 54. Counter 56 disposed in interior 58 is adapted to receive the detectable signal produced by sensors 54 and increases its count in response. Counter 56 includes display 62 which provides a visual indication of the count as it increases in number each lime a stalk enters and exits the range of detection of the sensor.

Figure 2:
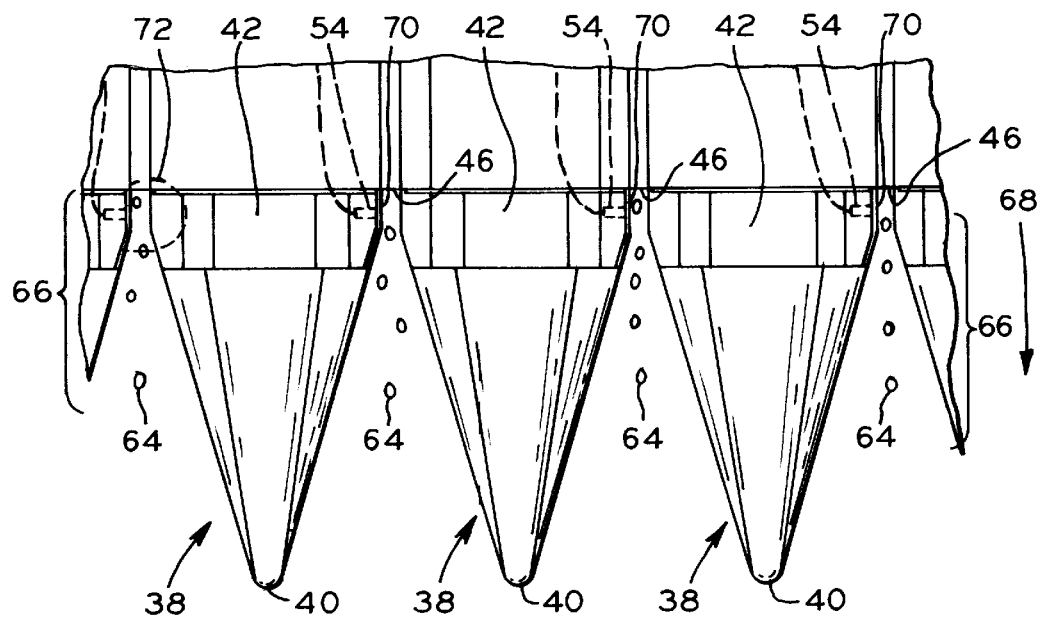
FIG. 2 is an enlarged section top plan view of a header of the farm vehicle of FIG. 1 including row separators.
Figure 3:
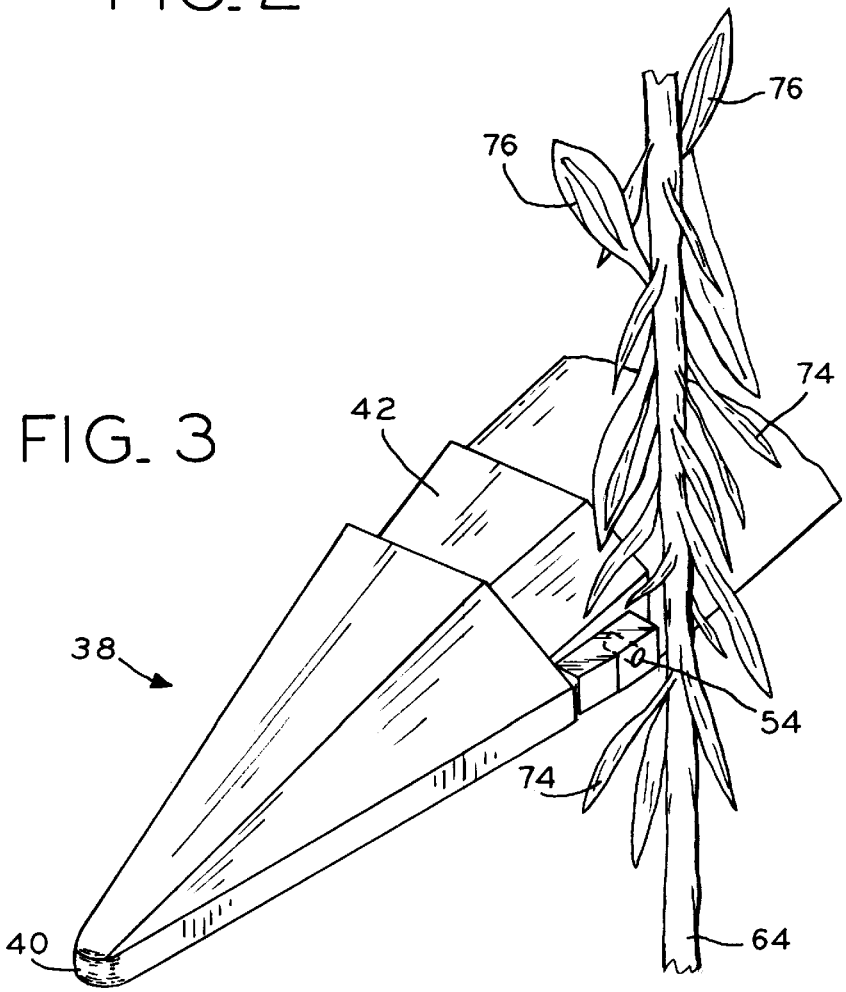
FIG. 3 is a perspective view of a row separator including the sensor arrangement of the present invention and a stalk of corn.

The arrangement of sensors 54 within row separators 38 can be further appreciated with reference to FIGS. 2a and 2b. As shown in FIG. 2, stalks 64 are arranged in rows 66. Combine 20 is positioned so that row separators 38 are aligned with rows 66 as shown in FIG. 2. Thus, as combine 20 is driven forwardly in the direction of arrow 68 shown FIG. 2, stalks 64 are directed by row separators 38 into grooves 70 whereupon they pass within the range of detection 72 of sensors 54. With reference to FIG. 3, leaves 74 also pass within the range of detection 72. However, leaves 74 do not have sufficient moisture content to cause sensor 54 to produce a signal. Typically, harvesting is done in October when leaves 74 are typically brown and therefore dry. Thus, the leaves on the stalks do not contain enough moisture to interfere with the moisture detector during normal harvesting season. If necessary, counting can be done when the leaves are healthy by adjusting the sensitivity of the moisture detector and/or allowing for a larger margin of error.

With further reference to FIG. 3, ears of corn 76 typically grow on stalks 64, but grow at a height on stalk 64 which exceeds the range of detection 72 of sensor 54. Therefore, the ears 76, even though they have a high moisture content, do not interfere with the counting of stalks 64 by sensor 54.

With reference to FIG. 4, sensor 54 is a capacitive proximity switch. Without wishing to be tied to any specific theory, a capacitive proximity switch operates on the principle that the relative capacitance of water far exceeds that of air so that when an object, such as a stalk of corn having a high moisture content comes within the range of detection of the capacitive proximity switch, the switch, acting as a capacitor, increases in capacitance and thereby a signal is given. A capacitive proximity switch suitable for the present invention is a type KI-3015-BPKG switch manufactured by Efector, Inc., a subsidiary of IFM Electronic. As shown in FIG. 4, sensor 54 includes machine threads 78, a detection face 80 and two hex nuts 82 and 84 which are used to secure sensor 54 as described below. Shielded wire 60 connects sensor 54 to coupling 86. Coupling 86 is a "quick-disconnect" connector that utilizes keyway polarization with a quick positive three point bayonet coupling system which ensures positive mating to prevent cross plugging. Coupling 86 includes a corrosion resistant aluminum shell which maintains the EMI integrity of the external wiring. A coupling suitable with the present invention is manufactured by Amphenol Company and is available from Newark Electronics. However, other suitable couplings may be employed with the present invention provided that such couplings provide adequate protection for the wiring in the environments in which the present invention is to be used.

Thus, wire 60 connects sensor 54 to coupling 86, which in turn connects to case 88. Case 88 houses counter 56 (not shown in FIG. 4). The exterior of case 88 is provided with display 62 and reset switch 90, which allows the counter to be reset to zero as desired.

The working circuit of the present invention is depicted in FIG. 4. Sensor 54 is connected to power supply 92, shown as a 12 volt DC power supply in this embodiment. Sensor 54 is connected to counter 56 which includes relay element 96. Resistor 98 is disposed between counter 56 and sensor 54.

Resistor 98 is a common carbon, non-precision one quarter watt, 1 K ohm resistor widely known in the art and available from any electronic component vendor. Relay element 96 is a solid state low voltage device capable of handling input and output signals. It has been found that a solid state relay manufactured by CP Clare Corporation, Semi-Conductor Group, performs satisfactorily with the present invention. Notable, the relay used with the present invention is a solid state relay. It has been found that a standard mechanical relay may not perform correctly at the speed of input during normal harvest conditions because such mechanical relay may experience "contact bounce" causing excessive transient noise to be delivered to the counter as stalks of corn are counted. Counter 56 may be a light weight battery powered LCD counter. A model H7E self powered counter manufactured by OMRON Corporation has been found to work satisfactorily with the present invention. On/off switch S1 can be any suitable switch widely known in the art to complete the circuit shown in FIG. 5. Switch S1 shown in FIG. 5 comprises a zero reset switch for counter 56.

Many methods can be used to mount sensor 54 of the present invention onto row separator 38. As shown in FIG. 6, detection face 80 of sensor 54 is positioned substantially flush with shroud 102. Shroud 102 in turn is attached to row separator 38 by a suitable connection, such as being welded to support plate 106 and shroud 102 respectively. Shroud 102 having sensor 54 disposed therein can be attached to a row separator by abutting support arm 104 against shroud 102 to position sensor 54 relative to row separator 38. The position of shroud 102 can be adjusted relative to the row separator for the desired positioning.

Figure 7:
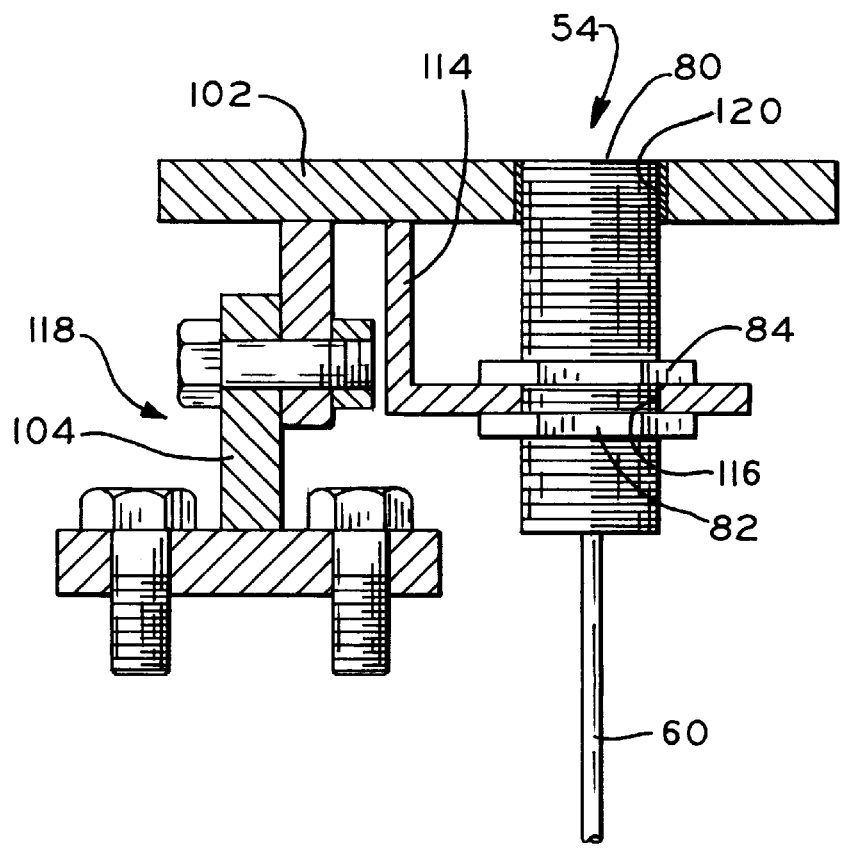
FIG. 7 is a side sectional view of the sensor mounted to a row separator of FIG. 6.

One particular mounting arrangement is shown in FIG. 7. Shroud 102 has sensor mounting arm 114 which aids in positioning sensor 54. Cylindrical bore 120, which receives sensor 54 therethrough, may be precisely formed to dimensions of sensor face 80, or a gap may be present between bore 120 and face 80. Because sensor 54 includes machine threads extending from detection face 80 to the other end of sensor 54, hex nuts 82 and 84 can be used to position detection face 80 relative to shroud 102. A combination of plates, threads, and bolts forming linkage 118 may also be used to couple shroud 102 to the agricultural equipment (not shown). For example, linkage 118 includes support arm 104 which is welded to the back of shroud 102 and is formed as shown as a 90° member extending downwardly. Shielded wire 60 extends from the back portion of sensor 54 and extends to counter case 88 (not shown in FIGS. 6 and 7).

Sensor 54, in other words, is received into cylindrical bore 116 of sensor arm 114 and also received in cylindrical bore 120 of shroud 102. The diameters of cylindrical bore 116 and 120 are adapted to be only slightly larger than the outside diameter of sensor 54, so that sensor 54 has a somewhat secure fit within the cylindrical bores. The securing of sensor 54 with respect to shroud 102 is further enhanced by the use of hex nuts 82 and 84, which allow sensor 54 to be aligned precisely with the cylindrical bore 120 and shroud 102.

While one suitable attachment mechanism of sensor 54 with respect to row separator 38 has been described, many other attachment mechanisms are possible. For example, FIG. 8 shows a sensor 54 totally enclosed by shroud 102 and enclosure walls 130. In such an installation, only detection face 80 of sensor 54 is exposed. Such an embodiment better protects sensor 54 and attached wire 60.

The method of operation of agricultural vehicle 20 having the crop counting apparatus of the present invention involves the operation of the combine. With reference to FIGS. 1, 2 and 3, as combine 20 moves forward through a field of corn, row separators 38 segregate corn stalks into rows which narrow down to a space of roughly 2 inches as shown as grooves 70 in FIG. 2. Thus, with further reference to FIG. 2, rows 66 are directed into grooves 70 whereupon stalks 64 enter into detection area 72 of sensor 54 before they are cut by cutting edge 46.

Figure 5:
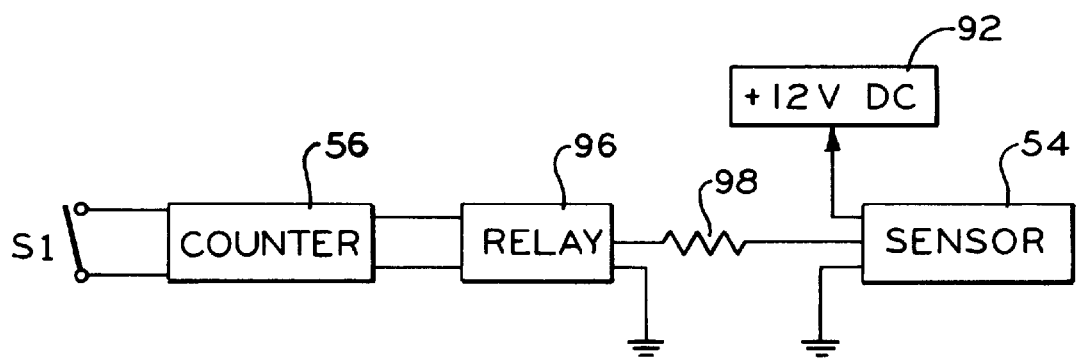
FIG. 5 is a schematic of the circuit comprising the present invention.

The properly adjusted sensor detects the moisture contained at the center of stalk 64, thereby generating a signal which is sent by shield wires 60 to cab 30 of combine 20 into the counter assembly 56. To adjust the sensor for accuracy, the operator passes a known number of stalks past the sensor, compares the count obtained by the counter with the known count, and adjusts the sensitivity of the sensor accordingly. If the counter's count is too high, the sensitivity is decreased and vice versa. The adjustment process can take place in a sample row of stalks and may be repeated a number of times to decrease the margin of error of the sensor. With reference to FIG. 5, the signal produced by sensor 54 is applied to relay element 96 via the current limiting resistor 98. Relay 96 opens and closes once for each stalk 64 that enters and then exits the detection range of sensor 54. As further shown in FIG. 5, the output of relay 96 is further connected by wire to the battery powered counter 56 where the stalk count is displayed in real time as shown at display 62 in FIGS. 1 and 4. Of course, the count can be reset at any time by using reset switch 90 as shown in FIG. 4. By using the present invention in the method as above described, it can now be appreciated that an accurate count of stalks which have been harvested can be obtained for a known area.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of using agricultural equipment to count a plurality of plants being processed, said method comprising:

installing a moisture sensor in the agricultural equipment, the sensor having a range of detection, the sensor producing a detectable signal when a plant is located within the range of detection;

connecting a counter to the moisture sensor, the counter adapted to respond to the detectable signal from the sensor by incrementing the count; and processing the plants by the agricultural equipment, the plurality of plants thereby entering and exiting the range of detection, each of the plants which enter and exit the range causing the sensor to produce the detectable signal, the counter receiving each of the detectable signals and increasing the count in response thereto, whereby the count corresponds to a quantity of plants being processed by the agricultural equipment.

2. The method of claim 1 wherein the counter includes a counter element and a relay element, the relay being connected to the counter element and the sensor, whereby the relay element relays the detectable signal to the counter element.

3. The method of claim 2 wherein the relay element is a digital relay.

4. The method of claim 1 further comprising the step of resetting the counter to zero.

5. The method of claim 1 wherein the installing step includes positioning the sensor to face substantially perpendicular to a direction of processing the items.

6. The method of claim 1 wherein the agricultural equipment is a combine which includes a plurality of row separators, one of the separators having the sensor installed therein.

7. The method claim of claim 6, wherein the combine includes a plurality of moisture sensors, at least one of the sensors being installed in each separator.

8. The method of claim 7 wherein the combine includes a plurality of counters, each one of the counters connected to at least two of the sensors.

9. The method of claim 7 wherein the combine includes a plurality of counters, each one of the counters connected to a respective one of the sensors.

10. Apparatus for counting plants being harvested, said apparatus comprising:

an agricultural implement having at least one harvesting element;

at least one moisture detector installed proximate said harvesting elements, said moisture detector having a detection range, whereby said moisture detector produces a signal when a moisture-containing plant is located within said range; and a counter in communication with said moisture detector, said counter capable of maintaining a count of said signals;

whereby said moisture detector communicates said signal to said counter to increase said count.

11. The apparatus of claim 10, wherein said counter further comprises a relay element and a counter element.

12. The apparatus of claim 11, wherein said relay element comprises a digital relay.

13. The apparatus of claim 10, wherein said moisture detector comprises a capacitive proximity switch.

14. The apparatus of claim 10, wherein a detection surface of said moisture detector is disposed substantially perpendicularly to a longitudinal axis of said harvesting element.

15. The apparatus of claim 10, wherein said agricultural implement comprises a plurality of harvesting elements, and a plurality of moisture detectors are installed proximate to respective ones of said harvesting elements.

16. The apparatus of claim 10, wherein said counter further comprises a reset switch.

17. An electronic device adapted for counting plants as they are harvested, said device comprising:

a moisture sensor having means for attaching to a harvesting portion of a farm vehicle, said moisture sensor having a range of detection and producing a detectable signal when a moisture-containing plant extends through said range; and a counter circuit electrically connected to said moisture sensor, said counter circuit adapted to increment a count upon receipt of said signal.

18. An electronic device of claim 17 further comprising a relay coupling said moisture detector and said counter circuit.

19. An electronic device of claim 18, wherein said relay element comprises a digital relay and a resistor is electrically connected to said digital relay and said capacitive proximity switch.

20. An electronic device of claim 17, wherein said counter includes a numerical display which can be reset to zero.

21. An electronic device of claim 17, wherein said moisture detector comprises a capacitive proximity switch.

* * * * *